United States Patent
Brunner et al.

(10) Patent No.: US 10,823,262 B2
(45) Date of Patent: Nov. 3, 2020

(54) DRIVE ASSEMBLY FOR HOME APPLIANCE

(71) Applicant: SHARKNINJA OPERATING LLC, Needham, MA (US)

(72) Inventors: Charles S. Brunner, Newton, MA (US); Colden Eldridge, Newton, MA (US); Ross Douglas Arriens, Newton, MA (US)

(73) Assignee: SHARKNINJA OPERATING LLC, Newton, MA (US)

( * ) Notice: Subject to any disclaimer, the term of this patent is extended or adjusted under 35 U.S.C. 154(b) by 80 days.

(21) Appl. No.: 15/769,291

(22) PCT Filed: Oct. 18, 2016

(86) PCT No.: PCT/US2016/057481
§ 371 (c)(1),
(2) Date: Apr. 18, 2018

(87) PCT Pub. No.: WO2017/070085
PCT Pub. Date: Apr. 27, 2017

(65) Prior Publication Data
US 2018/0340596 A1    Nov. 29, 2018

Related U.S. Application Data

(60) Provisional application No. 62/243,747, filed on Oct. 20, 2015.

(51) Int. Cl.
*F16H 13/06* (2006.01)
*A47J 43/046* (2006.01)
(Continued)

(52) U.S. Cl.
CPC ............ *F16H 13/06* (2013.01); *A47J 43/046* (2013.01); *A47J 43/085* (2013.01)

(58) Field of Classification Search
CPC ..... F16H 13/06; A47J 43/046; A47J 43/1025; A47J 43/085
See application file for complete search history.

(56) References Cited

U.S. PATENT DOCUMENTS 2,399,319 A * 4/1946 Bowen .................. D06F 37/38
                                                          475/318
2,600,762 A * 6/1952 Hartz .................... F02N 15/046
                                                          475/13
(Continued)

FOREIGN PATENT DOCUMENTS

EP         2457479 A1     5/2012

OTHER PUBLICATIONS

PCT ISR Written Opinion; International Application No. PCT/US2016/057481; International Filing Date: Oct. 18, 2016; dated Jan. 24, 2017; pp. 1-5.
(Continued)

*Primary Examiner* — Tinh Dang
(74) *Attorney, Agent, or Firm* — Cantor Colburn LLP

(57) ABSTRACT

A drive assembly for use in a piece of home equipment is provided including a center shaft having a central axis. A first drive component has a cavity formed therein and is configured to rotate about the central axis. A second drive component is at least partially nested within the cavity. The second drive component is configured to rotate about the central axis. The first drive component is operably coupled to a first rotary coupling and the second drive component is operably coupled to a second rotary coupling.

21 Claims, 5 Drawing Sheets

(51) Int. Cl.
*A47J 43/10* (2006.01)
*A47J 43/08* (2006.01)

(56) References Cited

U.S. PATENT DOCUMENTS

| | | | | | |
|---|---|---|---|---|---|
| 2,807,447 | A | * | 9/1957 | Vaughan | A47J 43/046 366/296 |
| 4,339,205 | A | * | 7/1982 | Kato | B01D 19/02 366/296 |
| 4,591,273 | A | * | 5/1986 | Meyer | A47J 43/046 366/288 |
| 6,700,244 | B2 | * | 3/2004 | Hsu | F16H 57/033 310/254.1 |
| 8,661,943 | B2 | * | 3/2014 | Cheung | A47J 43/08 74/356 |
| 2013/0264405 | A1 | | 10/2013 | Audette | |
| 2014/0027233 | A1 | * | 1/2014 | Baeumler | F16D 41/00 192/43 |
| 2015/0276020 | A1 | * | 10/2015 | Yoon | F16H 3/005 475/12 |

OTHER PUBLICATIONS

PCT Notification of Transmittal of The International Search Report; International Application No. PCT/US2016/057481; International Filing Date: Oct. 18, 2016; dated Jan. 24, 2017; pp. 1-6.
PCT International Preliminary Report on Patentability; International Application No. PCT/US2016/057481; International Filing Date: Oct. 18, 2016; dated Apr. 24, 2018; pp. 1-6.

* cited by examiner

DRIVE ASSEMBLY FOR HOME APPLIANCE

CROSS REFERENCE TO RELATED APPLICATIONS

This application is a National Stage application of PCT/US2016/057481, filed Oct. 18, 2016, which claims the benefit of U.S. Provisional Application No. 62/243,747, filed Oct. 20, 2015, both of which are incorporated by reference in their entirety herein.

BACKGROUND

This application is directed to a home appliance, and more particularly, to a drive system configured to operate a home appliance.

A variety of pieces of home equipment include a motor configured to drive a component of the home appliances about an axis of rotation. An example of one such piece of home equipment is a blender, commonly used to process a plurality of different food products, including liquids, solids, semi-solids, gels and the like. It is well-known that blenders are useful devices for blending, cutting, and dicing food products in a wide variety of commercial settings, including home kitchen use, professional restaurant or food services use, and large-scale industrial use. They offer a convenient alternative to chopping or dicing by hand, and often come with a range of operational settings and modes adapted to provide specific types or amounts of food processing, e.g., as catered to particular food products.

SUMMARY

According to one embodiment, a drive assembly for use in a piece of home equipment is provided including a center shaft having a central axis. A first drive component has a cavity formed therein and is configured to rotate about the central axis. A second drive component is at least partially nested within the cavity. The second drive component is configured to rotate about the central axis. The first drive component is operably coupled to a first rotary coupling and the second drive component is operably coupled to a second rotary coupling.

In addition to one or more of the features described above, or as an alternative, in further embodiments said first drive component is operably coupled to a motorized unit offset from said first drive component.

In addition to one or more of the features described above, or as an alternative, in further embodiments said first drive component is a pulley.

In addition to one or more of the features described above, or as an alternative, in further embodiments said first drive component is at least one of a toothed gear and sprocket.

In addition to one or more of the features described above, or as an alternative, in further embodiments rotation of said first drive component is driven pneumatically or hydraulically.

In addition to one or more of the features described above, or as an alternative, in further embodiments said first drive component is mounted directly to said center shaft.

In addition to one or more of the features described above, or as an alternative, in further embodiments at least one device is positioned between said center shaft and said first drive component to allow relative rotation thereof.

In addition to one or more of the features described above, or as an alternative, in further embodiments said second drive component includes a sun gear mounted for rotation with said center shaft and at least one planetary gear. The at least one planetary gear is configured to rotate about said sun gear.

In addition to one or more of the features described above, or as an alternative, in further embodiments said at least one second gear is operably coupled to said second rotary coupling.

In addition to one or more of the features described above, or as an alternative, in further embodiments said second rotary coupling is mounted to a distal end of said center shaft.

In addition to one or more of the features described above, or as an alternative, in further embodiments said second rotary coupling is positioned within a hollow interior of said first rotary coupling.

In addition to one or more of the features described above, or as an alternative, in further embodiments said first rotary coupling is configured to rotate about said central axis at a first speed and said second rotary coupling is configured to rotate about said central axis at a second speed. The second speed is faster than said first speed.

In addition to one or more of the features described above, or as an alternative, in further embodiments said first rotary coupling is configured to rotate about said central axis at a first speed and said second rotary coupling is configured to rotate about said central axis at a second speed. The first speed is faster than said second speed.

According to another embodiment, a piece of home equipment is provided including a base and at least one rotatable component operably coupled to the base. A drive assembly housed within the base is configured to drive rotation of the at least one rotatable component. The drive assembly includes a center shaft having a central axis. A first drive component has a cavity formed therein and is configured to rotate about the central axis. A second drive component is at least partially nested within the cavity and is configured to rotate about the central axis. The second drive component is configured to rotate about the central axis. A first rotary coupling is coupled to one of the first drive component and the second drive component and a second rotary coupling is coupled to the other of the first drive component and the second drive component.

In addition to one or more of the features described above, or as an alternative, in further embodiments said first drive component is operably coupled to said first rotary coupling and said second drive component is operably coupled to said second rotary coupling.

In addition to one or more of the features described above, or as an alternative, in further embodiments said first drive component is operably coupled to said second rotary coupling and said second drive component is operably coupled to said first rotary coupling.

In addition to one or more of the features described above, or as an alternative, in further embodiments said first drive component is operably coupled to a motorized unit positioned within said base, said motorized unit being offset from said first drive component.

In addition to one or more of the features described above, or as an alternative, in further embodiments during operation of said piece of home equipment, both said first rotary coupling and said second rotary coupling are configured to rotate about said axis.

In addition to one or more of the features described above, or as an alternative, in further embodiments said first rotary coupling is configured to rotate about said central axis at a first speed and said second rotary coupling is configured to rotate about said central axis at a second speed. The first speed is different than said second speed.

In addition to one or more of the features described above, or as an alternative, in further embodiments the piece of home equipment includes an attachment configured for removable association with said base. The attachment includes said at least one rotatable component such that when said attachment is coupled to said base, said drive assembly is configured to drive rotation of said at least one rotatable component.

In addition to one or more of the features described above, or as an alternative, in further embodiments an interchangeable first attachment and second attachment are configured for removable association with said base. The first attachment is configured to associate with said first rotary coupling and said second attachment being configured to associate with said second rotary coupling.

BRIEF DESCRIPTION OF THE FIGURES

The accompanying drawings incorporated in and forming a part of the specification embodies several aspects of the present invention and, together with the description, serves to explain the principles of the invention. In the drawings.

The detailed description explains embodiments of the invention, together with advantages and features, by way of example with reference to the drawings.

DETAILED DESCRIPTION

Figure 1:
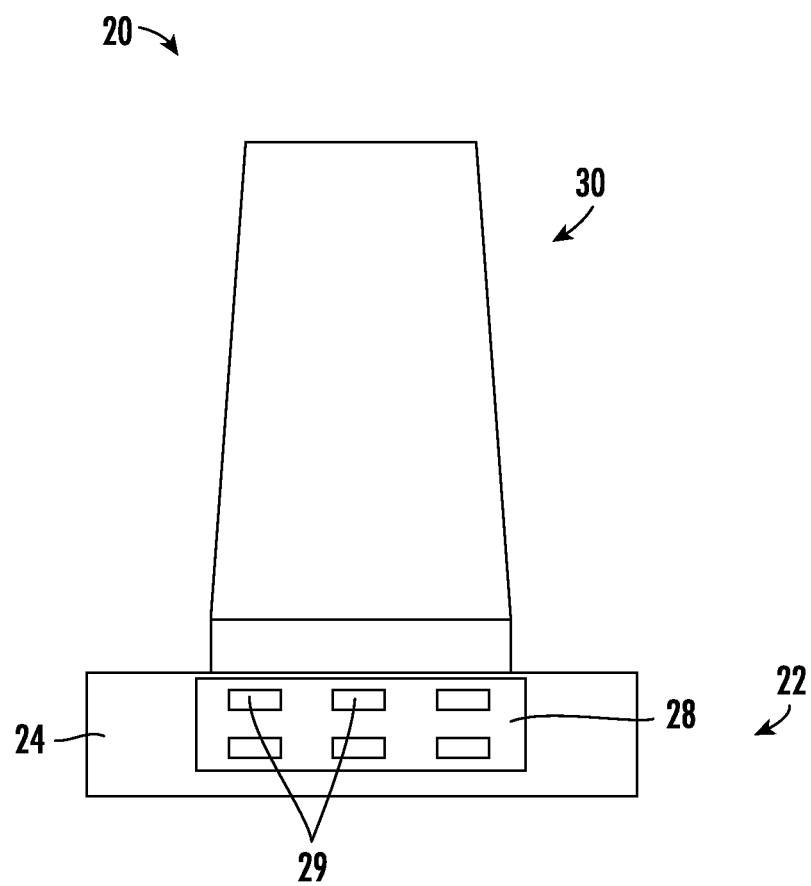
FIG. 1 is a front view of an example of a home appliance.
Figure 2:
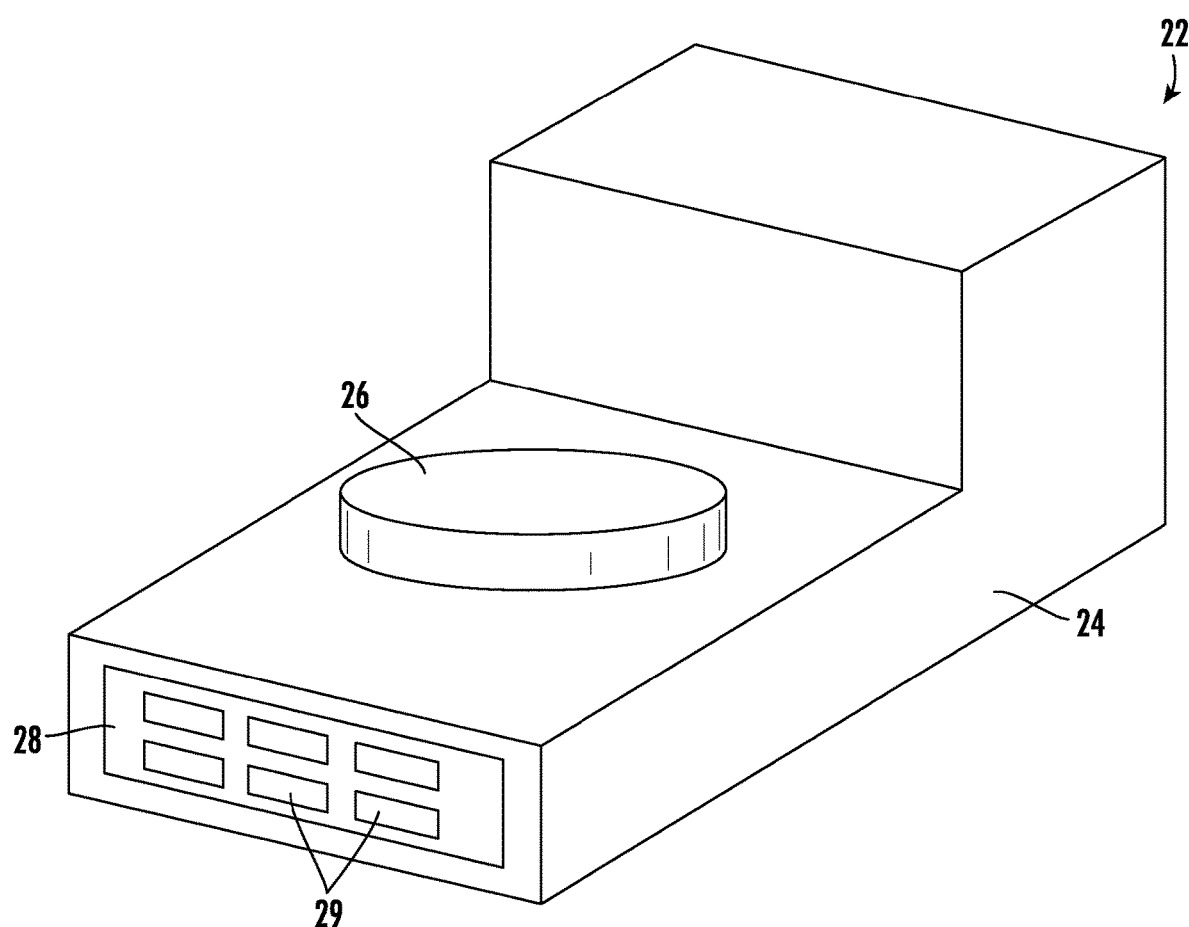
FIG. 2 is a perspective view of an example of a base of the home appliance of FIG. 1 system.

Referring now to FIGS. 1 and 2, an example of a piece of home equipment 20 is illustrated in more detail. As shown, the piece of home equipment is a system for processing food and can be adapted to perform any food processing or blending operation including as non-limiting examples, dicing, chopping, cutting, slicing, mixing, blending, stirring, crushing, or the like. The illustrated system for processing food 20 includes a base 22 having a body or housing 24 within which a motorized unit (not shown) and at least one controller (not shown) are located. The base 22 includes at least one rotary coupling 26 (see FIG. 2) for example, driven by the motorized unit within the body 24. The base 22 additionally includes a control panel or user interface 28 with options for turning the motorized unit on and off and for selecting various modes of operation, such as pulsing, blending, or continuous food processing.

A plurality of interchangeable attachments 30 varying in size and/or functionality may be configured for use with the base 22. For example, in FIG. 1, the attachment 30 connected to the food processor base 22 is a generally hollow container. Each attachment 30 is configured to engage a portion of the at least one rotary coupling 26 when coupled to the base 22 for the processing of food products located within an interior of the attachment 30. This will become more apparent in subsequent FIGS. and discussion.

Figure 3:
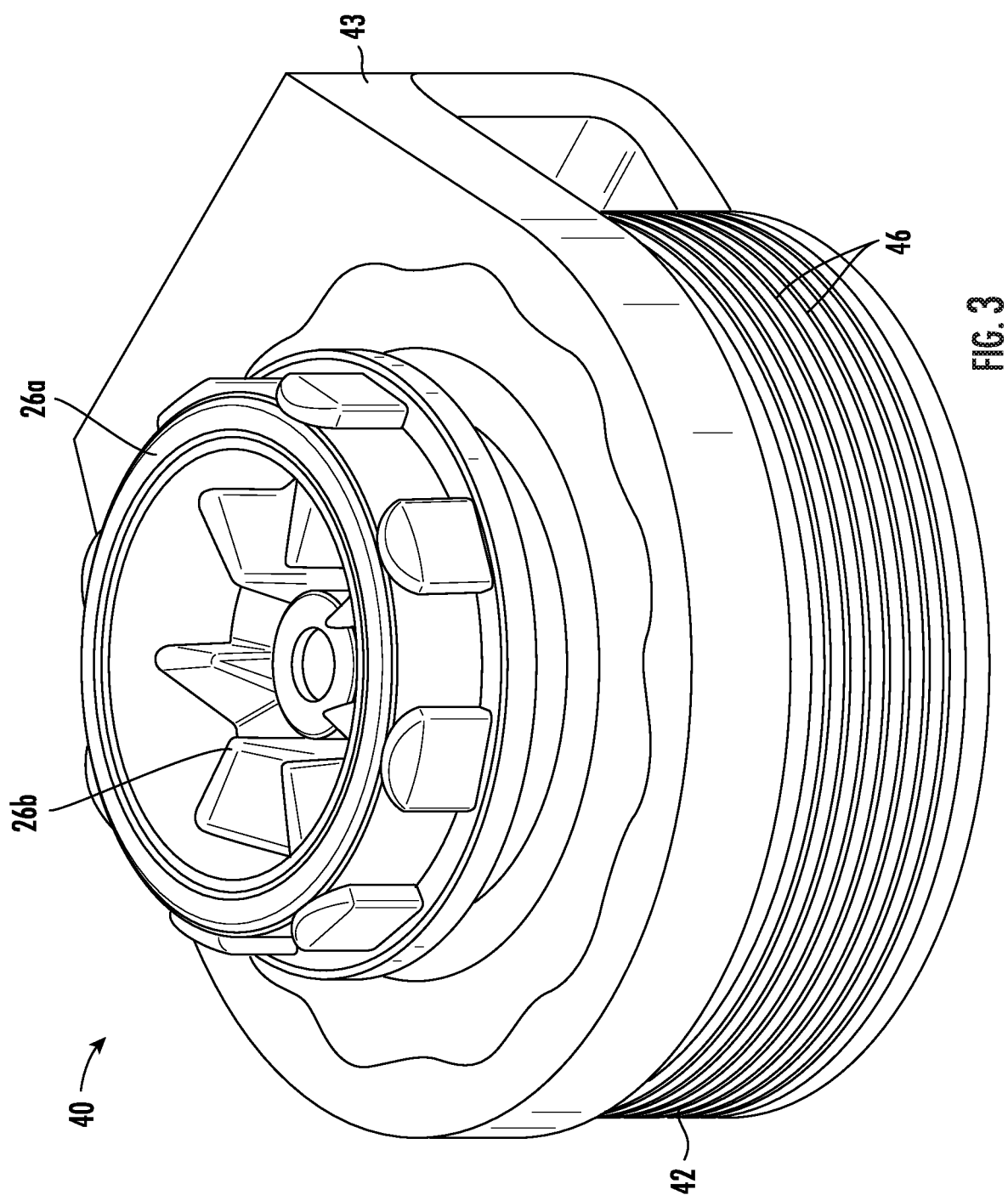
FIG. 3 is a perspective view of a drive assembly configured for use in a home appliance according to an embodiment.
Figure 4:
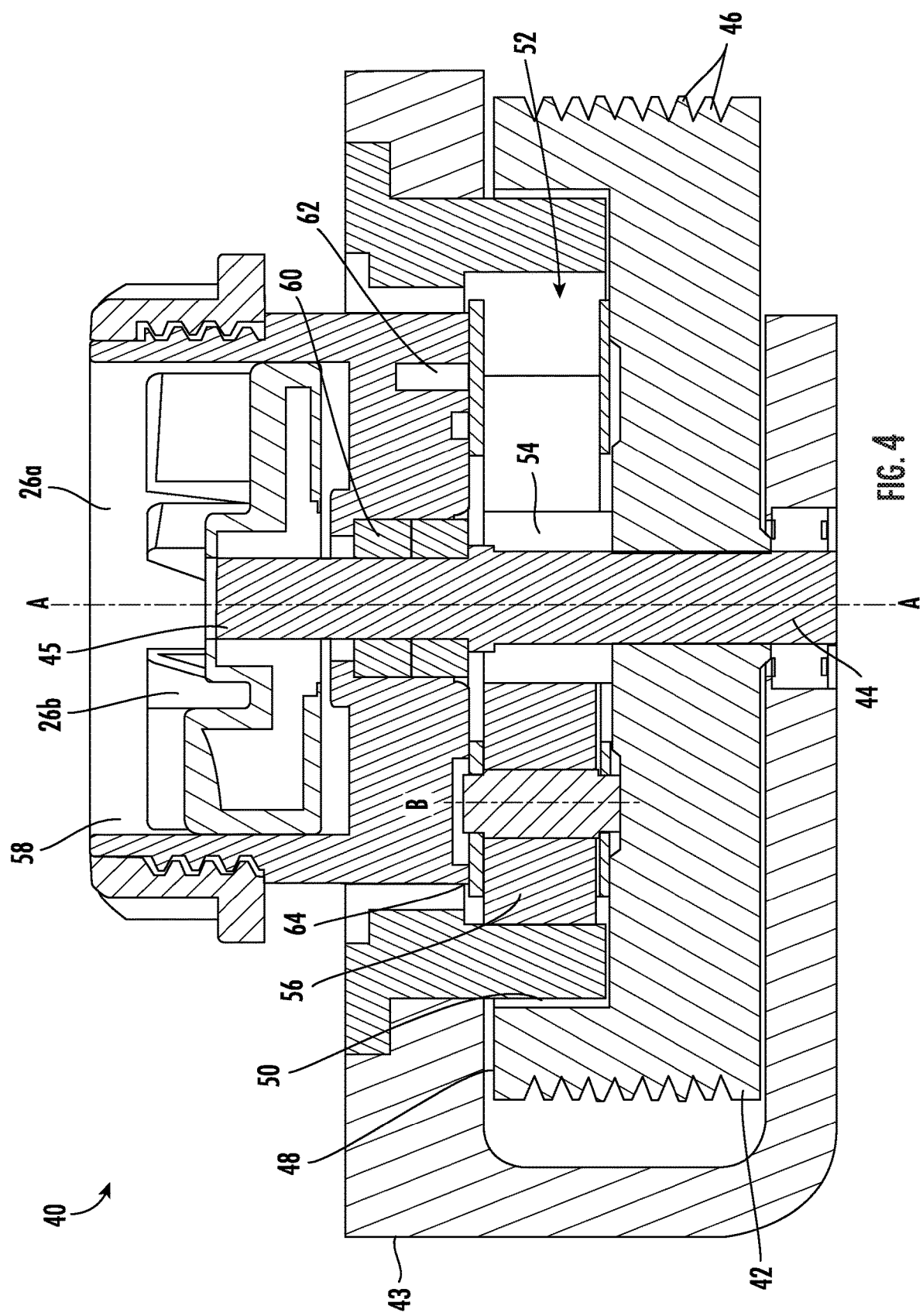
FIG. 4 is a cross-sectional view of a drive assembly configured for use in a home appliance according to an embodiment.

Referring now to FIGS. 3-4, a drive assembly 40 configured to drive rotation of at least one rotary component of the piece of home equipment 20 about a central axis A is illustrated in more detail. Although the piece of home equipment illustrated and described herein is a system for processing food, any other type of home equipment including a motor and a drive train or assembly is within the scope of the invention. Examples of other types of home equipment include, but are not limited to home appliances, such as blenders, food processors, mixers, roasters, vacuums, carpet cleaners, steam cleaners, can openers, dishwashers, home maintenance tools, such as lawn mowers, leaf blowers, pressure washers, snow blowers, and home power tools, such as drills, saws, nail guns, and sanders for example.

Figure 5:
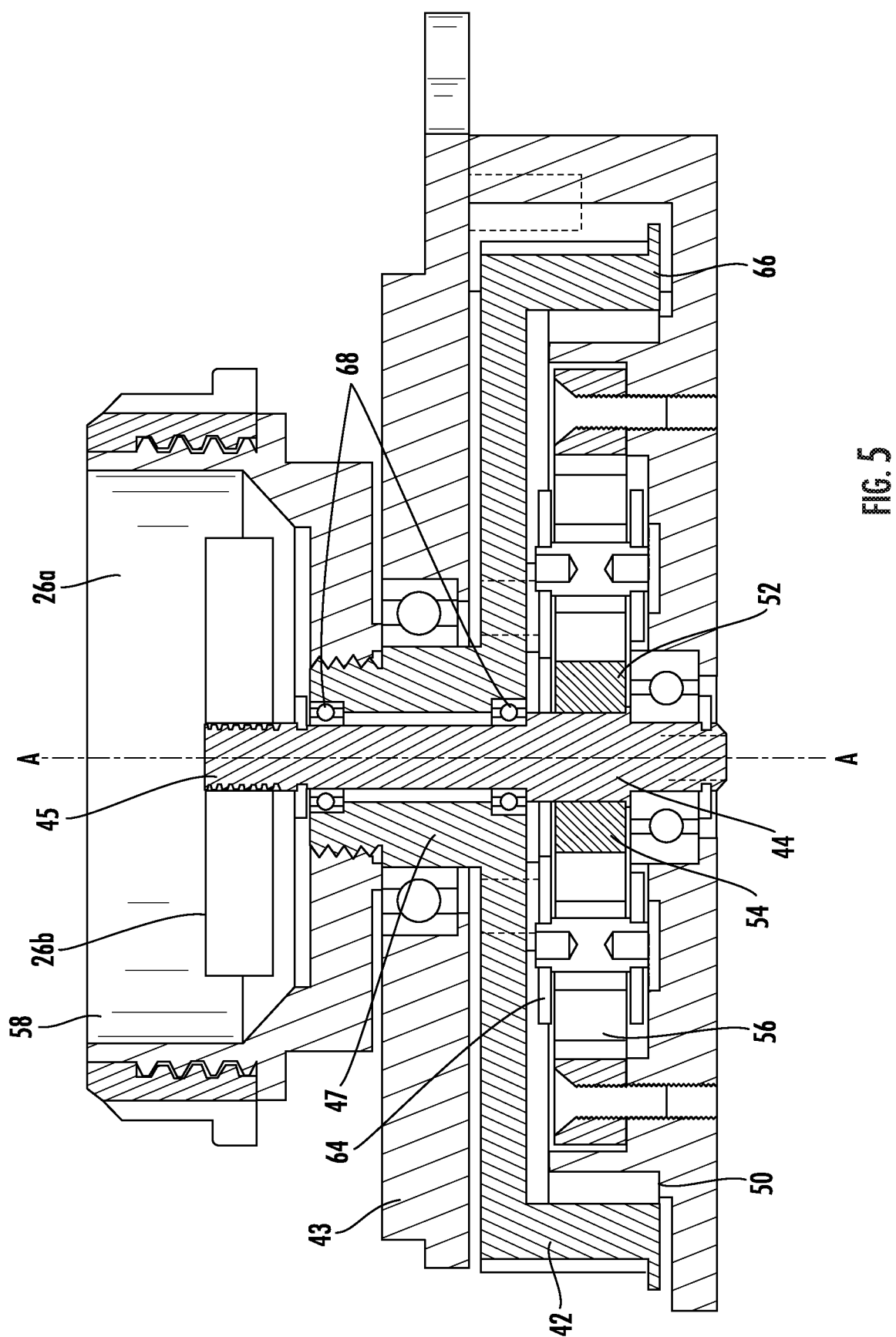
FIG. 5 is a cross-sectional view of a drive assembly configured for use in a home appliance according to another embodiment.

The drive assembly 40 includes a first component 42 mounted within a mounting frame 43. The mounting frame 43, may, but need not be formed by the housing 24 of the base 22. The first component 42 is fixedly mounted to a rotatable center shaft 44 and is operably coupled to an offset power source (not shown). Although a motorized power source is most common, other types of power sources, such as a manually driven power system for example, is also within the scope of the disclosure. In the illustrated, non-limiting embodiment, the first component 42 is a pulley and a belt (not shown) is configured to transmit rotation from the motorized unit to the pulley 42 and shaft 44. The belt may include a plurality of teeth generally complementary to any grooves 46 formed in the first component 42, as shown in the FIGS, or alternatively, may have a generally flat surface configured to drive the first component 42 via friction (FIG. 5). It should be understood that the belt driven first component 42 illustrated and described herein is intended as an example only, and that other types of components configured to operably couple to the motorized unit, such as a toothed gear or sprocket for example, are also within the scope of the disclosure. In addition, embodiments where the motorized unit is configured to pneumatically or hydraulically rotate a portion of the drive assembly 40 are also within the scope of the invention.

The first drive component 42 has a cavity 50 formed in a first side 48 thereof, for example an upper side. The cavity 50 extends over only a portion of the height of the first drive component 42 such that the first component 42 remains structurally stable. Nested at least partially within the cavity 50 of the first drive component 42 is a second drive component 52. As shown the second drive component 52 includes a first gear 54 fixedly mounted to the center shaft 44, also referred to as a sun gear. The second drive component 52 additionally includes at least one second or planetary gear 56 mounted adjacent to and interposed with the first gear 54. The at least one second gear 56 is configured to rotate not only about the axis of the center shaft 44, in the same direction of rotation as the center shaft 44, but also about its own axis in a direction opposite the rotation of the center shaft 44. Because the second gear 56 must travel around the center shaft 44 to complete one revolution, the center shaft 44 rotates a plurality of times about axis A during the time required for the second gear 56 to complete a single revolution about the axis A of the center shaft 44. Although only one second gear 56 is illustrated in the FIGS., embodiments including a plurality of second or planetary gears 56 are within the scope of the disclosure.

The drive assembly 40 additionally includes a first rotary coupling 26a and a second rotary coupling 26b. In the illustrated, non-limiting embodiment, the first rotary coupling 26a is disposed vertically above the first and second gear 54, 56, and the second rotary coupling 26b is positioned within a hollow interior 58 of the first rotary coupling 26a. However, a drive assembly 40 having the first and second rotary coupling 26a, 26b arranged in other configurations are also within the scope of the disclosure. Each of the couplings 26a, 26b may include unique features, such as grooves or teeth for example, configured to couple the coupling to one of the plurality of attachments 30 configured for use with the system for processing food 20. In the illustrated, non-limiting embodiment, the first rotary coupling 26a is arranged concentrically about the center shaft 44 via a device 60, for example a bearing configured to allow the first rotary coupling 26a to rotate relative to the center shaft 44. The first rotary coupling 26a is operably coupled to at least a portion 64 of the second drive component 52, such as with a fastener 62 for example. As a result, rotation of the second drive component 52, specifically the second gear 56, about the axis A of the center shaft 44 drives rotation of the first rotary coupling 26a about the axis of the center shaft 44. The second rotary coupling 26b is mounted directly to a distal end 45 of the center shaft 44, and is therefore configured to rotate at the same speed as the shaft 44.

As a result of the gear reduction between the first drive component 42 and the second drive component 52, the second rotary coupling 26b and the first rotary coupling 26a, coupled to the center shaft 44 and the planetary gear 56, respectively, are configured to rotate at different rotational speeds. In the illustrated, non-limiting embodiment of FIGS. 3 and 4, the second rotary coupling 26b is configured to rotate at a speed greater than that of the first rotary coupling 26a.

Another embodiment of the drive assembly 40 is illustrated in FIG. 5. As shown, the second drive component 52 is again at least partially nested within the cavity 50 of the first drive component 42. However, in this embodiment, the cavity 50 is formed in a lower surface 66 of the first drive component 42, such that at least a portion of the first component 42 is positioned vertically above the second drive component 52.

In this embodiment of the drive assembly 40, the first drive component 42 is operably coupled to the first rotary coupling 26a and the second drive component 52 is operably coupled to the second rotary coupling 26b. As shown, a portion 47 of the first drive component 42 extends through the mounting frame 43 to couple directly to the first rotary coupling 26a. Although the first rotary coupling 26a is shown as being configured to threadably attach to the portion 47 of the first drive component 42, other types of connections are within the scope of the disclosure. As in the previous embodiment, the second rotary coupling 26b is mounted directly to the distal end 45 of the center shaft 44, and is therefore configured to rotate at the same speed as the shaft 44.

With respect to the second drive component 52, the first drive component 42 is attached, such as with a fastener for example, to a portion 64 of the second gear 56. Rotation of the at least one planetary gear 56 about the sun gear 54 fixed to the shaft 44 is configured to drive rotation of the shaft 44 about axis A. At least one bearing or other relative rotation device 68 is arranged between the first drive component 42 and the central shaft 44 to allow relative rotation between the first drive component 42 and the second drive component 52. As a result of the configuration of the second drive component 52, the center shaft 44 is configured to rotate at a speed greater than that of the first drive component 42, such that the rotational speed of the second rotary coupling 26b is considered "geared up" relative to the rotational speed of the first rotary coupling 26a, and the rotational speed of the first drive component 42. Although two distinct configurations of the drive assembly 40 are illustrated and described herein, it should be understood that other configurations are within the scope of the disclosure.

The attachments 30 of the system 20 are configured to connect to at least one of the first rotary coupling 26a and the second rotary coupling 26b such that the rotation of the couplings 26a,b drives operation of the attachment 30 and the system 20. By having the motorized unit arranged offset from the central shaft 44, the drive assembly 40 illustrated and described herein provides the benefit of having a reduced vertical height compared to conventional drive assemblies where the motorized unit is directly connected to and arranged coaxially with the shaft 44. As a result, the overall size of the food processing system 20 may be reduced.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments of this invention are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A drive assembly for use in a piece of home equipment, comprising:
   a center shaft having a central axis;
   a first drive component having a cavity formed therein, said first drive component being configured to rotate about said central axis, wherein rotation of said first drive component drives rotation of said center shaft about said central axis,
   a second drive component at least partially nested within said cavity, said second drive component being configured to rotate about said central axis;
   a first rotary coupling rotatable about said central axis; and a second rotary coupling rotatable about said central axis, wherein said first drive component is operably coupled to said first rotary coupling and said second drive component is operably coupled to said second rotary coupling.

2. The drive assembly according to claim 1, wherein said first drive component is operably coupled to a motorized unit offset from said first drive component.

3. The drive assembly according to claim 1, wherein said first drive component is a pulley.

4. The drive assembly according to claim 1, wherein said first drive component is at least one of a toothed gear and sprocket.

5. The drive assembly according to claim 1, further comprising a drive source operably coupled to said first drive component, wherein said drive source is one of a pneumatic drive source and a hydraulic drive source.

6. The drive assembly according to claim 1, wherein said first drive component is mounted directly to said center shaft.

7. The drive assembly according to claim 1, wherein at least one device is positioned between said center shaft and said first drive component to allow relative rotation thereof.

8. The drive assembly according to claim 1, wherein said second drive component includes a sun gear mounted for rotation with said center shaft and at least one planetary gear, said at least one planetary gear configured to rotate about said sun gear.

9. The drive assembly according to claim 8, wherein said at least one second gear is operably coupled to said second rotary coupling.

10. The drive assembly according to claim 1, wherein said second rotary coupling is mounted to a distal end of said center shaft.

11. The drive assembly according to claim 10, wherein said second rotary coupling is positioned within a hollow interior of said first rotary coupling.

12. The drive assembly according to claim 1, wherein said first rotary coupling is configured to rotate about said central axis at a first speed and said second rotary coupling is configured to rotate about said central axis at a second speed, said second speed being faster than said first speed.

13. The drive assembly according to claim 1, wherein said first rotary coupling is configured to rotate about said central axis at a first speed and said second rotary coupling is configured to rotate about said central axis at a second speed, said first speed being faster than said second speed.

14. A piece of home equipment, comprising:
a base;
at least one rotatable component operably coupled to said base; and
a drive assembly housed within said base, the drive assembly being configured to drive rotation of the at least one rotatable component, the drive assembly including:
a center shaft having a central axis;
a first drive component having a cavity formed therein, said first drive component being configured to rotate about said central axis, wherein rotation of said first drive component drives rotation of said center shaft about said central axis,
a second drive component at least partially nested within said cavity, said second drive component being configured to rotate about said central axis;
a first rotary coupling rotatable about said central axis; and
a second rotary coupling rotatable about said central axis, wherein at least one of said first drive component and said second drive component is operably coupled to said first rotary coupling and the other of said first drive component and said second drive component is operably coupled to said second rotary coupling.

15. The piece of home equipment according to claim 14, wherein said first drive component is operably coupled to said first rotary coupling and said second drive component is operably coupled to said second rotary coupling.

16. The piece of home equipment according to claim 14, wherein said first drive component is operably coupled to said second rotary coupling and said second drive component is operably coupled to said first rotary coupling.

17. The piece of home equipment according to claim 14, wherein said first drive component is operably coupled to a motorized unit positioned within said base, said motorized unit being offset from said first drive component.

18. The piece of home equipment according to claim 14, wherein during operation of said home appliance, both said first rotary coupling and said second rotary coupling are configured to rotate about said axis.

19. The piece of home equipment according to claim 18, wherein said first rotary coupling is configured to rotate about said central axis at a first speed and said second rotary coupling is configured to rotate about said central axis at a second speed, the first speed being different than said second speed.

20. The piece of home equipment according to claim 14, further comprising an attachment configured for removable association with said base, said attachment including said at least one rotatable component, such that when said attachment is coupled to said base, said drive assembly is configured to drive rotation of said at least one rotatable component.

21. The piece of home equipment according to claim 20, wherein an interchangeable first attachment and second attachment are configured for removable association with said base, said first attachment being configured to associate with said first rotary coupling and said second attachment being configured to associate with said second rotary coupling.

* * * * *